(12) United States Patent
Gimat et al.

(10) Patent No.: US 11,015,460 B2
(45) Date of Patent: May 25, 2021

(54) BLADE COMPRISING A BLADE BODY MADE OF COMPOSITE MATERIAL AND A LEADING-EDGE SHIELD

(71) Applicant: Safran Aircraft Engines, Paris (FR)

(72) Inventors: Matthieu Arnaud Gimat, Moissy-cramayel (FR); Alain Jacques Michel Bassot, Moissy-cramayel (FR); Jérémy Guivarc'h, Moissy-cramayel (FR); Jean-Noël Mahieu, Moissy-cramayel (FR); Thibault Ruf, Moissy-cramayel (FR)

(73) Assignee: Safran Aircraft Engines, Paris (FR)

( * ) Notice: Subject to any disclaimer, the term of this patent is extended or adjusted under 35 U.S.C. 154(b) by 127 days.

(21) Appl. No.: 15/750,381

(22) PCT Filed: Aug. 2, 2016

(86) PCT No.: PCT/FR2016/052010
§ 371 (c)(1),
(2) Date: Feb. 5, 2018

(87) PCT Pub. No.: WO2017/025682
PCT Pub. Date: Feb. 16, 2017

(65) Prior Publication Data
US 2018/0230825 A1 Aug. 16, 2018

(30) Foreign Application Priority Data

Aug. 7, 2015 (FR) ........................................ 1557612

(51) Int. Cl.
*F01D 5/28* (2006.01)
*F01D 5/14* (2006.01)
*C09J 5/00* (2006.01)

(52) U.S. Cl.
CPC ................. *F01D 5/282* (2013.01); *C09J 5/00* (2013.01); *F01D 5/147* (2013.01); *F01D 5/288* (2013.01);
(Continued)

(58) Field of Classification Search
CPC ... F01D 5/14; F01D 5/147; F01D 5/28; F01D 5/282; F01D 5/286; F01D 5/288;
(Continued)

(56) References Cited

U.S. PATENT DOCUMENTS 5,141,400 A * 8/1992 Murphy .................. B29C 43/18
416/204 A
6,471,485 B1 * 10/2002 Rossmann .............. F01D 5/282
416/230

(Continued)

FOREIGN PATENT DOCUMENTS

EP 2586972 A2 5/2013
FR 2995037 A1 3/2014
(Continued)

OTHER PUBLICATIONS

Process Systems, Elastomer Properties, Sep. 2, 2013, PEEK section (Year: 2013).*

(Continued)

*Primary Examiner* — David Hamaoui
*Assistant Examiner* — Justin A Pruitt
(74) *Attorney, Agent, or Firm* — Bookoff McAndrews, PLLC

(57) ABSTRACT

The invention relates to comprising a blade body (9) made of composite material having a polymer matrix reinforced by fibers and a leading edge shield (10) made of material having greater ability to withstand point impacts than the composite material of the blade body. The leading edge shield (10) is assembled on the blade body (9) by means of (Continued)

a first adhesive (16) and a second adhesive (17), both adhesives (16, 17) being deposited between the blade body (9) and the leading edge shield (10). Both adhesives (16, 17) form respective continuous films between the blade body (9) and the leading edge shield (10).

26 Claims, 2 Drawing Sheets

(52) U.S. Cl.
CPC ..... *C09J 2400/226* (2013.01); *F05D 2230/20* (2013.01); *F05D 2240/303* (2013.01); *F05D 2260/30* (2013.01); *F05D 2300/174* (2013.01); *F05D 2300/501* (2013.01); *F05D 2300/518* (2013.01); *F05D 2300/603* (2013.01)

(58) Field of Classification Search
CPC ... C09J 5/00; C09J 2400/226; F05D 2230/20; F05D 2240/303; F05D 2260/30; F05D 2300/174; F05D 2300/501; F05D 2300/518; F05D 2300/603; B64D 45/02; B64C 11/205; B29D 99/0025; B29C 65/48

USPC ......................................................... 416/224
See application file for complete search history.

(56) References Cited

U.S. PATENT DOCUMENTS

| | | | |
|---|---|---|---|
| 2009/0074586 A1* | 3/2009 | Le Hong | F01D 5/147 416/230 |
| 2010/0232974 A1* | 9/2010 | De Moura | F01D 5/16 416/230 |
| 2016/0123159 A1* | 5/2016 | Thompson | F01D 11/12 415/196 |
| 2016/0208813 A1* | 7/2016 | Zafiris | F04D 29/023 |

FOREIGN PATENT DOCUMENTS

WO  WO 2014/133546 A1  9/2014
WO  WO 2015/034612 A1  3/2015

OTHER PUBLICATIONS

International Search Report and Written Opinion with English translation dated Oct. 20, 2016, in corresponding International Application No. PCT/FR2016/052010 (10 pages).

* cited by examiner

BLADE COMPRISING A BLADE BODY MADE OF COMPOSITE MATERIAL AND A LEADING-EDGE SHIELD

CROSS-REFERENCE TO RELATED APPLICATIONS

This application is the U.S. national phase entry under 35 U.S.C. § 371 of International Application No. PCT/FR2016/052010, filed on Aug. 2, 2016, which claims priority to French Patent Application No. 1557612, filed on Aug. 7, 2015, the entireties of each of which are herein incorporated by reference.

BACKGROUND OF THE INVENTION

The present invention relates to a blade made of composite material and including a leading edge shield. Such leading edge shields are typically for protecting the leading edges of rotary blades or of guide vanes against impacts. In this context, the term "blade" covers not only rotary blades, e.g. fan blades or propeller blades, but also guide vanes. In order to limit their weight, such blades are typically made of composite material comprising a polymer matrix reinforced by fibers. Although such materials present mechanical qualities that are generally very favorable, in particular relative to their weight, they are somewhat sensitive to point impacts. Shields, typically made of very strong metal material, such as titanium alloys, are therefore normally installed on the leading edges of such blades in order to protect them against such impacts. Such shields are normally in the form of a thin pressure side fin and a thin suction side fin that are joined together by a thicker section placed astride the leading edge, the assembly matching the shape of the blade on its leading edge and on the adjacent pressure side and suction side sections. The pressure side and suction side fins extend over those sections respectively of the pressure side and of the suction side of the blade where they serve mainly to position and fasten the shield on the leading edge.

In order to improve the aerodynamic performance of blades, their leading edges are presenting shapes that are ever more complex, thereby complicating the fabrication of shields to match these shapes closely, and also complicating securing a shield on a blade.

Furthermore, in the event of impacts against a blade, the shield can become at least partially separated from the leading edge of the composite blade, giving rise to an unbalance accompanied by aerodynamic losses. In addition, if a portion of the shield is torn off, the leading edge of the blade is no longer protected over its full height, and the leading edge of the blade that has been laid bare is generally irregular, also leading to aerodynamic loss. It is then necessary to repair the blade and/or replace it.

OBJECT AND SUMMARY OF THE INVENTION

The present invention seeks to remedy those drawbacks.

To this end, the invention provides a blade comprising a blade body made of composite material having a polymer matrix reinforced by fibers and a leading edge shield made of material having greater ability to withstand point impacts than the material of the blade body, the leading edge shield being assembled on the blade body by means of a first adhesive and a second adhesive, both adhesives being deposited between the blade body and the leading edge shield, both adhesives forming respective continuous films between the blade body and the leading edge shield, the second adhesive having a critical stress intensity factor and an energy release rate that are greater respectively than a critical stress intensity factor and an energy release rate of the first adhesive.

The term "toughness" is commonly used for designating two physical magnitudes, the critical stress intensity factor $K_{IC}$, which is expressed in megapascals per square-root meter (MPa/m$^{1/2}$), and the energy release rate $G_{IC}$ which is expressed in kilojoules per square meter (kJ/m$^2$). Since the toughness of the second adhesive is greater than the toughness of the first adhesive, the force that needs to be applied to separate the leading edge shield from the blade body is greater than it would be if the blade body and the shield were assembled together using only the first adhesive.

Thus, by using two adhesives that form respective continuous films between the blade body and the leading edge shield, it is possible to provide "retention" adhesion over the portions that are the most likely to separate as a result of an impact against the leading edge of the blade, or as a result of contact between the blade and a casing.

It should be understood that the first and second adhesives do not mix and do not react with each other. Thus, the first and second adhesives are not two compounds that are to react with each other in order to provide adhesion when they come into contact with each other.

The first adhesive may have a Young's modulus greater than the Young's modulus of the second adhesive.

Since the Young's modulus of the first adhesive is greater than the Young's modulus of the second adhesive, the first adhesive serves to provide rigid adhesion between the blade body and the leading edge shield. This type of adhesion is also referred to as "structural" adhesion between the blade body and the leading edge shield, such that the leading edge shield is firmly attached to the blade body.

In the following description, the terms "radially inner" and "radially outer" refer to the ends of the blade when it is assembled on a rotor, the term "radially inner" referring to the end of the blade that is closer to the axis of rotation, and the term "radially outer" referring to the end of the blade that is further from the axis of rotation. The same applies to the ends of the shield.

The leading edge shield has a radially inner end, a radially outer end, and a radial height, and the second adhesive may be deposited at least over a radially outer portion of the leading edge shield, preferably over the last 50% of the radial height of the leading edge shield starting from the radially inner end, still more preferably over the last 65% of the radial height of the leading edge shield starting from the radially inner end.

The term "radial height" of the leading edge shield should be understood as the distance measured between the orthogonal projections of the radially inner end and the radially outer end of the leading edge shield onto a line passing through the axis of rotation of the rotor and having at least one intersection with the blade.

The second adhesive is thus deposited on the radially outer portion of the leading edge shield in the region of the blade where the leading edge shield is more likely to become separated. Furthermore, the first adhesive is thus deposited on the radially inner portion of the leading edge shield so as to form a continuous film between the blade body and the leading edge shield.

The leading edge shield has a pressure side fin connected to a suction side fin by a central body, each fin having a free edge and a fin width defined between the central body and the corresponding free edge, the second adhesive being deposited at least over a portion of the width of each fin measured from each free edge, preferably over 20% of the width of each fin, more preferably over 10% of the width of each fin.

A large area of structural adhesion is thus made available while guaranteeing better retention adhesion between the blade body and the leading edge shield close to the free edges of the fins of the leading edge shield, which are zones where the risk of the leading edge shield separating and potentially leading to unbalance are greater than over a central section of the leading edge shield, for example.

Furthermore, the first adhesive may be a thermosetting adhesive and the second adhesive may be a thermoplastic adhesive.

By way of example, the critical stress intensity factor $K_{IC,2}$ of the second adhesive may be greater than or equal to 1.5 MPa/m$^{1/2}$, preferably greater than or equal to 2 MPa/m$^{1/2}$.

By way of example, the energy release rate $G_{IC,2}$ of the second adhesive may be greater than or equal to 0.3 kJ/m$^2$, preferably greater than or equal to 1 kJ/m$^2$.

The leading edge shield may be made of a titanium-based alloy.

This material presents very good ability to withstand point impacts.

The term "titanium-based alloy" is used to designate alloys in which the weight content of titanium is in the majority. It can be understood that titanium is thus the element having the weight content in the alloy that is the greatest. By way of example, the titanium-based alloy may have a weight content of titanium of at least 50%, preferably of at least 70%, more preferably of at least 80%.

BRIEF DESCRIPTION OF THE DRAWINGS

The invention can be well understood and its advantages appear better on reading the following detailed description of an embodiment shown by way of non-limiting example. The description refers to the accompanying drawings, in which.

DETAILED DESCRIPTION OF THE INVENTION

Figure 1:
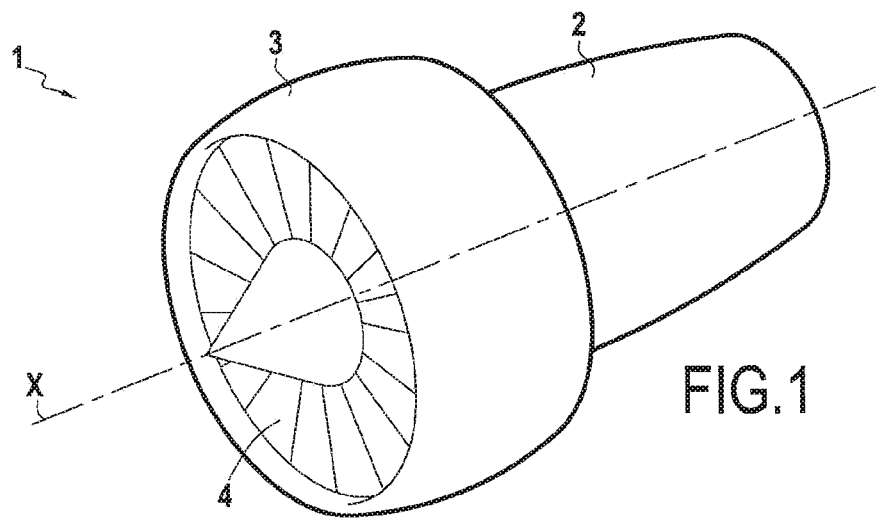
FIG. 1 is a diagrammatic perspective view of a bypass turbojet.
Figure 2:
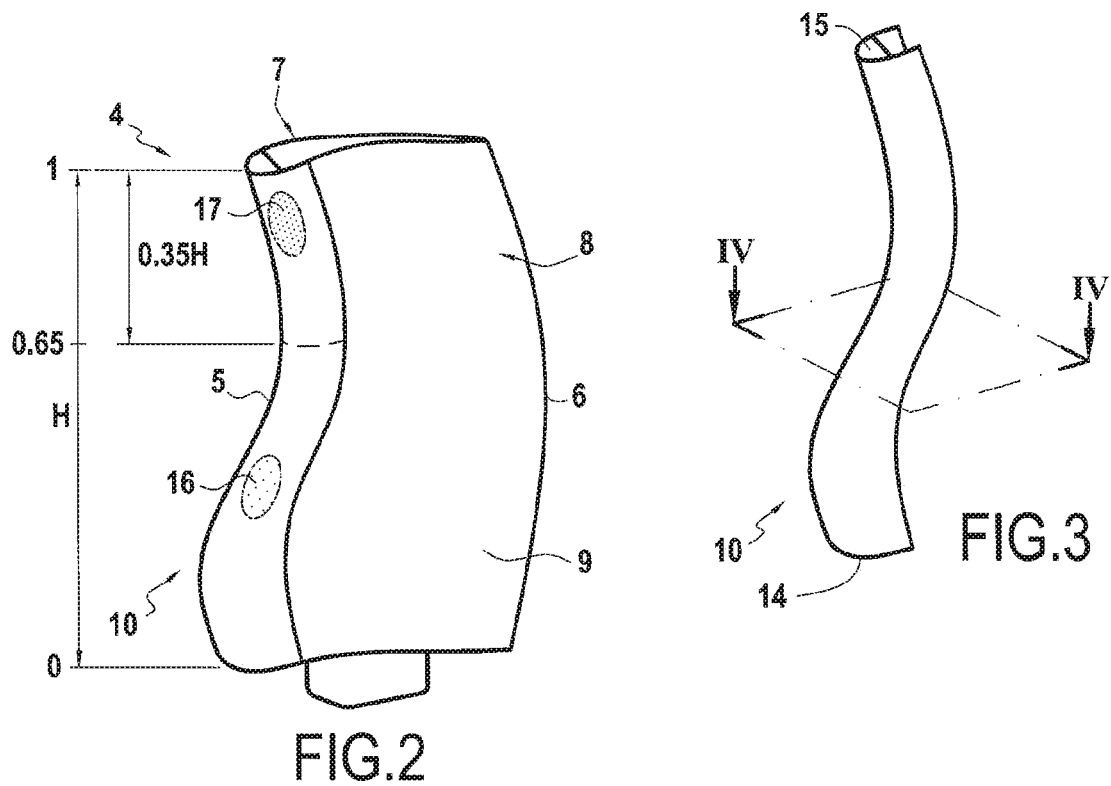
FIG. 2 is a diagrammatic perspective view of a rotary blade of the fan of the FIG. 1 turbojet in a first embodiment of the blade.

FIG. 1 shows a bypass turbojet 1 having a gas generator unit 2 and a fan 3. The fan 3 comprises a plurality of rotary blades 4 that are arranged radially around a central axis X and that are aerodynamically profiled so as to drive air when they rotate. Thus, as shown in FIG. 2, each blade 4 has a leading edge 5, a trailing edge 6, a suction side 7, and a pressure side 8.

In normal operation, the relative air flow is oriented substantially towards the leading edge 5 of each blade 4.

Thus, the leading edge 5 is particularly exposed to impacts. In particular, when the blade 4 comprises a blade body 9 made of composite material, in particular having a polymer matrix reinforced by fibers, it becomes appropriate to protect the leading edge 5 with a shield 10 that is integrated with each blade.

Figure 3:
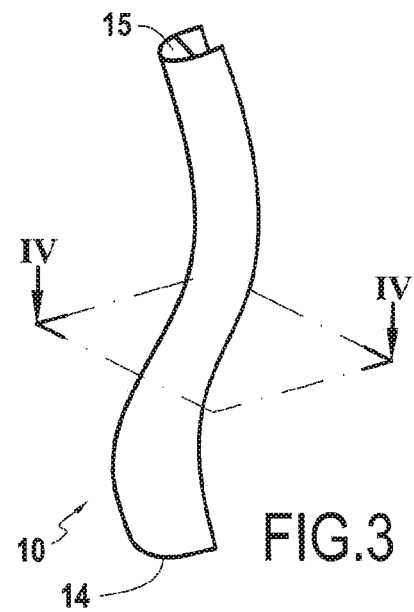
FIG. 3 is a diagrammatic perspective view of a leading edge shield for the FIG. 2 blade.
Figure 4:
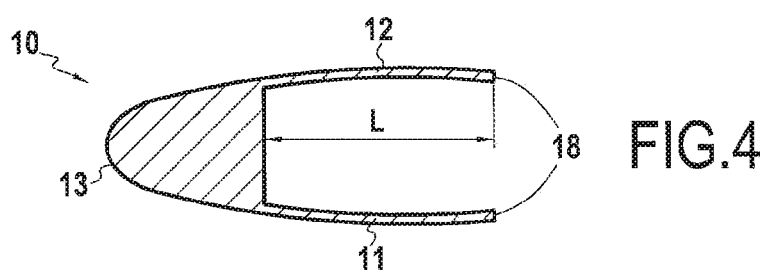
FIG. 4 is a cross-section view on plane IV-IV of the FIG. 3 shield.

FIGS. 3 and 4 show the shield 10 that presents a pressure side fin 11, a suction side fin 12, and a central section 13 of greater thickness that is to be placed astride the edge of the blade body 9, and that connects together the pressure side fin 11 and the suction side fin 12. The pressure side and suction side fins 11 and 12 serve to position the shield 10 on the blade boy 9.

The shield 10 also has a radially inner end 14 and a radially outer end 15. As can be seen in FIG. 2, orthogonal projections of the radially inner end 14 and of the radially outer end 15 of the shield 10 onto a line passing via the axis of rotation of the rotor and having at least one intersection with the blade 4 together define a radial height H of the shield 10, thereby defining a reference height for the shield 10.

Going away from the central section 13, each of the pressure side and suction side fins 11 and 12 has a free edge 18. The width L of each fin 11, 12 is defined between the central body 13 and the corresponding free edge 18.

The leading edge shield 10 is made mainly of metal, and more specifically of a titanium-based alloy, such as for example TA6V (Ti-6Al-4V). The leading edge shield 10 could equally well be made of steel or iron-based alloy, of chromium, and of nickel, e.g. such as the Inconels.

In FIG. 2, the leading edge shield 10 has a radially inner end 14 and a radially outer end 5 with a radial height H, the second adhesive 17 is placed over 35% of the radial height of the leading edge shield 10 starting from the radially outer end 15, i.e. over the last 65% of the radial height H of the leading edge shield 10, starting from the radially inner end 14.

Thus, since the first adhesive 16 has a Young's modulus $E_1$ that is greater than the Young's modulus $E_2$ of the second adhesive 17, structural adhesion is provided between the leading edge shield 10 and the blade body 4 over the radially inner height of the leading edge shield 10 starting from the radially inner end 14 covered with the first adhesive 16.

In addition, since the second adhesive 17 has a critical stress intensity factor $K_{IC,2}$ and an energy release rate $G_{IC,2}$ that are respectively greater than the critical stress intensity factor $K_{IC,1}$ and the energy release rate $G_{IC,1}$ of the first adhesive 16, the portion of the radial height of the leading edge shield 10 starting from the radially outer end 15 that is covered by the second adhesive 17 is better at absorbing impacts and avoiding loss of adhesion of the shield on the leading edge 4 of the blade body 9.

Figure 5:
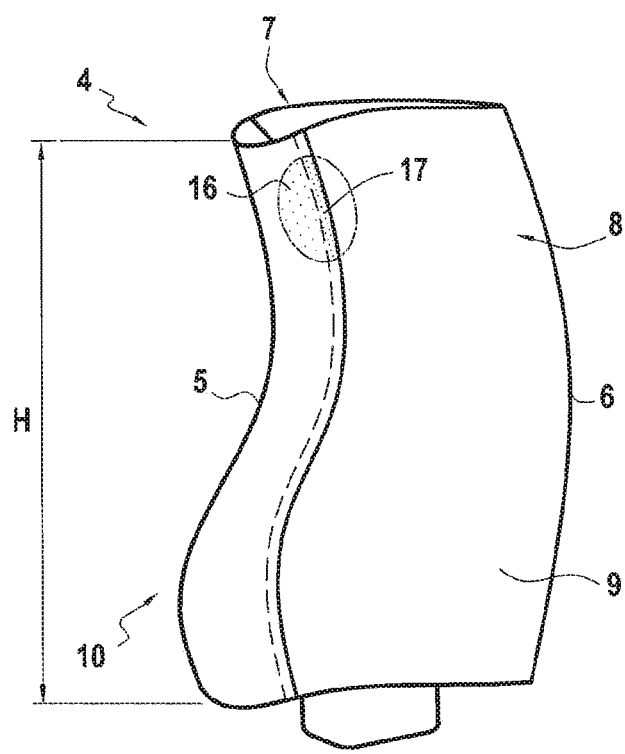
FIG. 5 is a diagrammatic perspective view of a rotary blade of the fan of the FIG. 1 turbojet in a second embodiment of the blade.

FIG. 5 shows a blade 4 in which the second adhesive 17 is deposited over the width of each fin starting from each free edge 18, e.g. over 20% of the width of each fin.

Figure 6:
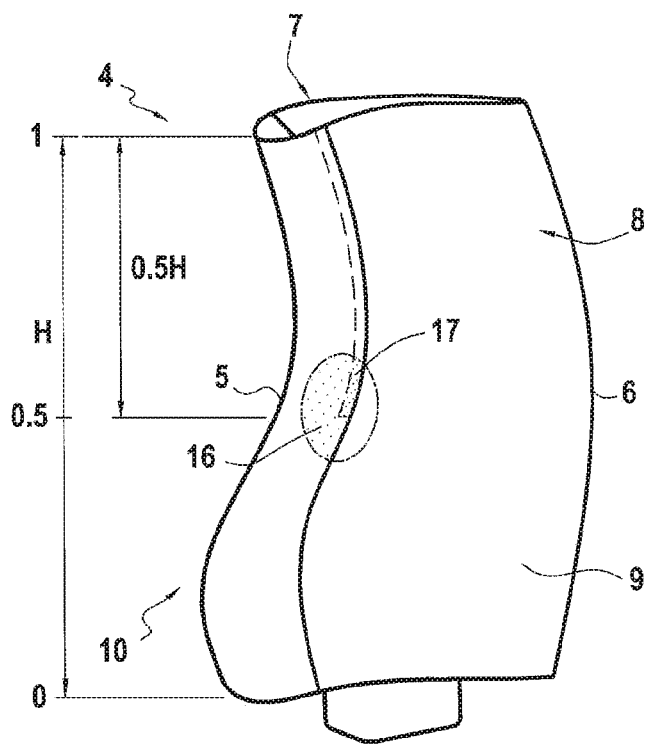
FIG. 6 is a diagrammatic perspective view of a rotary blade of the fan of the FIG. 1 turbojet in a third embodiment of the blade.

In FIG. 6, the leading edge shield 10 is assembled on the blade body 9 by a continuous film of adhesive, the second adhesive 17 being deposited over a portion of the 50% of the radial height of the leading edge shield 10 starting from the radially outer end 15, i.e. over the last 50% of the radial height H of the leading edge shield 10 starting from the radially inner end 14, and in this example over 10% of the width of each fin 11, 12 measured from each free edge 18. Or conversely, the second adhesive 17 is deposited over a portion of the 10% of the width of each fin 11, 12 measured from each free edge 18, this portion being equal to 50% of the radial height of the leading edge shield 10 starting from the radially outer end 15, i.e. over the last 50% of the height of the leading edge shield 10, starting from the radially inner end 14.

This ensures structural adhesion over the full height H of the leading edge shield 10, and the second adhesive 17 is used close to the free edges 18 of the pressure side and suction side fins 11 and 12. Thus, if impacts are received by the radially outer portion of the leading edge shield 10, and even if cracks appear between the leading edge shield 10 and the blade body 9 in the radially outer portion of the leading edge shield 10, the leading edge shield 10 is held firmly on the blade body 9 because of the strip constituted by the second adhesive 17 located close to each of the free edges 18 of the adhesive shield 10. The width of this strip of adhesive is sufficient to guarantee the function of retaining the leading edge shield 10 on the blade body 9.

The first adhesive 16 may be a thermosetting adhesive. Thus, once the first adhesive 16 has set, it is no longer possible to separate the leading edge shield 10 from the blade body 9 by heating the blade 4. Under the effect of impacts, since the toughness of the first adhesive is less than the toughness of the second adhesive, cracks might appear and lead in the long run to the shield separating.

The second adhesive 17 may be a thermoplastic adhesive. This type of adhesive has the advantage of having toughness values that are greater than the toughness values of thermosetting adhesives. Thus, although the adhesion obtained using a thermoplastic adhesive can be reversed by heating the part above a threshold temperature specific to each thermoplastic adhesive, this second adhesive 17 is better at absorbing impacts and at avoiding degradation of the adhesion between the leading edge shield 10 and the blade body 9.

The adhesive sold by 3M under the reference AF191 is an example of an adhesive that can be used as the first adhesive. It is a thermosetting adhesive having a Young's modulus $E_1$ equal to 100 megapascals (MPa) with a critical stress intense factor $K_{IC,1}$ of about 1 MPa/m$^{1/2}$ and with energy release rate $G_{IC,1}$ of about 0.2 kJ/m$^2$.

Polyetheretherketone, also known under the acronym PEEK, is an example of adhesive that can be used as the second adhesive. It is a thermoplastic adhesive having a Young's modulus $E_2$ equal to 3.6 gigapascals (GPa), with a critical stress intensity factor $K_{IC,2}$ greater than 2 MPa/m$^{1/2}$ and energy release rate $G_{IC,1}$ greater than 1 kJ/m$^2$.

Although the present invention is described with reference to various specific examples, it is clear that other modifications and changes could be undertaken on those example without going beyond the general ambit of the invention as defined by the claims. In addition, individual characteristics of the various embodiments mentioned may be combined in additional embodiments. Consequently, the description and the drawings should be considered in a sense that is illustrative rather than restrictive.

The invention claimed is:

1. A blade comprising a blade body made of composite material having a polymer matrix reinforced by fibers and a leading edge shield made of material having greater ability to withstand point impacts than the composite material of the blade body, the blade being characterized in that the leading edge shield is assembled on the blade body by means of a first adhesive and a second adhesive, both adhesives being deposited between the blade body and the leading edge shield, both adhesives forming respective continuous films between the blade body and the leading edge shield;

the second adhesive having a critical stress intensity factor and an energy release rate that are greater respectively than a critical stress intensity factor and an energy release rate of the first adhesive, wherein the leading edge shield has a radially inner end and a radially outer end and a radial height defined between these two ends, and the second adhesive is deposited at least over the radially outer end of the leading edge shield and extending only partially toward the radially inner end of the leading edge shield;

the second adhesive extending from the radially outer end, toward the radially inner end, only to a boundary disposed between the radially outer end and the radially inner end, and the first adhesive extending from the radially inner end, toward the radially outer end, only to the boundary.

2. The blade according to claim 1, wherein the first adhesive has a Young's modulus greater than the Young's modulus of the second adhesive.

3. The blade according to claim 1, wherein the second adhesive is deposited over the last 50% of the radial height of the leading edge shield starting from the radially inner end.

4. The blade according to claim 1, wherein the second adhesive is deposited over the last 65% of the radial height of the leading edge shield starting from the radially inner end.

5. The blade according to claim 1, wherein the leading edge shield has a pressure side fin connected to a suction side fin by a central body, each fin having a free edge and a fin width defined between the central body and the corresponding free edge, the second adhesive being deposited at least over a portion of the width of each fin measured from each free edge.

6. The blade according to claim 5, wherein the second adhesive is deposited over 20% of the width of each fin.

7. The blade according to claim 1, wherein the first adhesive is a thermosetting adhesive and the second adhesive is a thermoplastic adhesive.

8. The blade according to claim 1, wherein the critical stress intensity factor of the second adhesive is greater than or equal to 1.5 MPa/m1/2.

9. The blade according to claim 1, wherein the critical stress intensity factor of the second adhesive is greater than or equal to 2 MPa/m1/2.

10. The blade according to claim 1, wherein the energy release rate of the second adhesive is greater than or equal to 0.3 kJ/m2.

11. The blade according to claim 1, wherein the energy release rate of the second adhesive is greater than or equal to 1 kJ/m2.

12. The blade according to claim 1, wherein the leading edge shield is made of a titanium-based alloy.

13. The blade according to claim 1, wherein the leading edge shield has a pressure side fin connected to a suction side fin by a central body, each fin having a free edge and a fin width defined between the central body and the corresponding free edge, the second adhesive is deposited at least over a portion of the width of each fin measured from each free edge, the second adhesive being in direct contact with each free edge.

14. The blade according to claim 13, wherein the first adhesive has a Young's modulus greater than the Young's modulus of the second adhesive.

15. The blade according to claim 13, wherein the second adhesive is deposited over 20% of the width of each fin.

16. The blade according to claim 1, wherein the second adhesive is deposited over the last 50% of the radial height of the leading edge shield starting from the radially inner end.

17. The blade according to claim 1, wherein the second adhesive is deposited over the last 65% of the radial height of the leading edge shield starting from the radially inner end.

18. The blade according to claim 1, wherein the second adhesive is deposited over 10% of the width of each fin.

19. The blade according to claim 1, wherein the first adhesive is a thermosetting adhesive and the second adhesive is a thermoplastic adhesive.

20. The blade according to claim 1 wherein the critical stress intensity factor of the second adhesive is greater than or equal to 1.5 MPa/m1/2.

21. The blade according to claim 1, wherein the critical stress intensity factor of the second adhesive is greater than or equal to 2 MPa/m1/2.

22. The blade according to claim 1, wherein the energy release rate of the second adhesive is greater than or equal to 0.3 kJ/m2.

23. The blade according to claim 1, wherein the energy release rate of the second adhesive is greater than or equal to 1 kJ/m2.

24. The blade according to claim 1, wherein the leading edge shield is made of a titanium-based alloy.

25. The blade according to claim 1, wherein the second adhesive includes polyetherketone.

26. The blade according to claim 1, wherein the leading edge shield includes a steel or iron-based alloy.

* * * * *